J. D. STILLMAN.
Cotton Seed Huller.
No. 91,880.  Patented June 29, 1869.
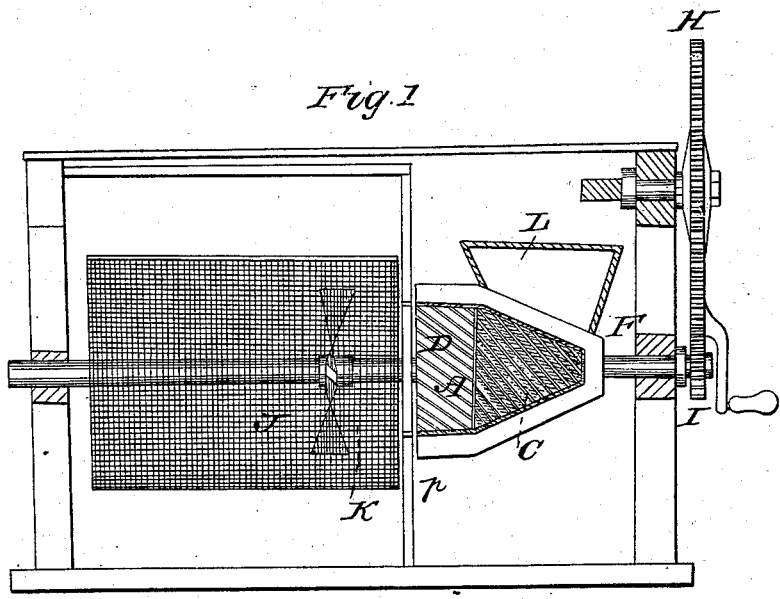
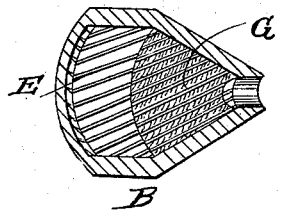
Witnesses
Henry E. Green
Eb Hastings
Inventor
John D. Stillman

United States Patent Office.

JOHN D. STILLMAN, OF MEMPHIS, TENNESSEE.

Letters Patent No. 91,880, dated June 29, 1869.

---

IMPROVEMENT IN COTTON-SEED HULLERS.

---

The Schedule referred to in these Letters Patent and making part of the same.

---

*To all whom it may concern:*

Be it known that I, JOHN D. STILLMAN, of Memphis, in the county of Shelby, in the State of Tennessee, have invented a new and improved Cotton-Seed Huller; and I do hereby declare that the following is a full, clear, and exact description of the construction and operation of the same, reference being had to the annexed drawings, making a part of this specification, in which—

Figure 1 is a vertical section.
Figure 2, a section of the drum.
A, cylinder.
B B, drum.
C, grooves.
D, steel bars on cylinder A.
E, steel bars on drum B B.
G, grooves in the drum B B.
F, axle.
H, drive-wheel.
I, small wheel on the end of the axle F.
K, fan.
J, bolt.
L, hopper.

To enable others skilled in the art to make and use my invention, I will proceed to describe its construction and operation.

I construct a cylinder out of cast-iron, cast-steel, or other suitable material, conical at one end, terminating in a plane cylinder at the other, as shown at A in fig. 1 of the accompanying drawings; and upon the conical part of the cylinder, I form grooves C, with sharp edges, which I place at a greater or less angle to the axis of the cylinder.

Upon the plane portion of the cylinder, I fasten, by means of grooves cut in the cylinder, steel bars D, with square cutting-edges. These bars are placed obliquely upon the face of the cylinder.

I construct a drum, B B, to fit upon the cylinder A, so as to enclose it, leaving a small space between the cylinder and drum, for the passage of the cotton-seed while undergoing the hulling-process.

Upon the inside of the drum I form grooves G and bars E, corresponding with those formed upon the cylinder, placing them, however, at an opposite angle to those upon the cylinder.

My object in placing these grooves and bars at opposite angles, is to impart to the cotton-seed passing between them, a rotary motion, so as to expose all sides of the seed to the grinding and cutting-action of the grooves and bars, and in this way remove the shell from the seed, with as little crushing of the kernel of the seed as possible.

Another object accomplished by this manner of arranging the grooves and bars, is the rapid feeding of the machine.

The cylinder D is made fast upon the axle F. Motion is imparted by the drive-wheel H acting upon the small wheel I.

The drum B B is prevented from turning with the motion of the cylinder, by being made fast to the frame P.

For the purpose of separating the kernel of the seed from the shell, I provide a bolt, J, constructed out of wire cloth, or other suitable material, and attach it to the axle F, so as to join close upon the cylinder.

The seed, in passing through the hulling-process, will drop into the bolt.

Upon the inside of the bolt I construct a fan, K, with propeller-shaped flanges, arranged so as to produce, with the turning of the axle, a current of air through the bolt, so as to blow the shells and lint of the seed through the open end of the bolt.

The operation of this machine will be very simple.

The seed are placed in the hopper L, and will pass in between the drum and cylinder, and pass out into the bolt, husked.

What I claim as my invention, and desire to secure by Letters Patent, is—

The cotton-seed huller, as shown, composed of the cylinder A with its bars D and grooves C, drum B with bars E and grooves G, and the bolt J, and propeller-shaped fan K, all constructed, arranged, and operating substantially as and for the purpose herein set forth.

JOHN D. STILLMAN.

Witnesses:
   HENRY E. GREEN,
   EB. HASTINGS.